June 17, 1952 — W. L. BUEDINGEN — 2,601,087
KITCHEN TOOL AND UTENSIL
Filed Aug. 5, 1949 — 2 SHEETS—SHEET 1

INVENTOR.
WILLIAM L. BUEDINGEN
BY
ATTORNEY

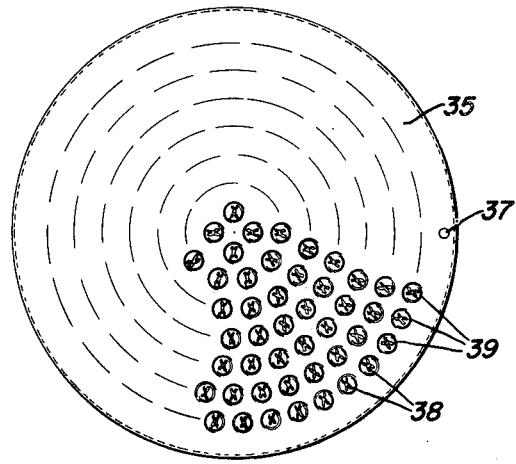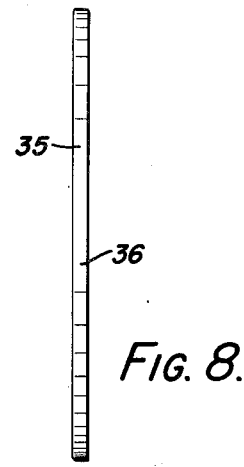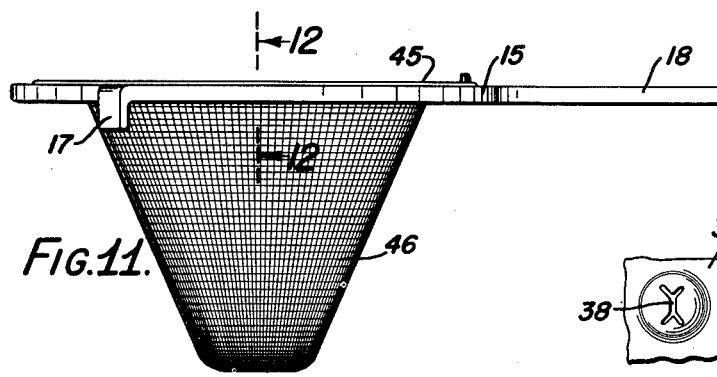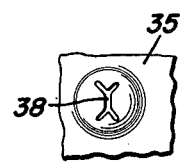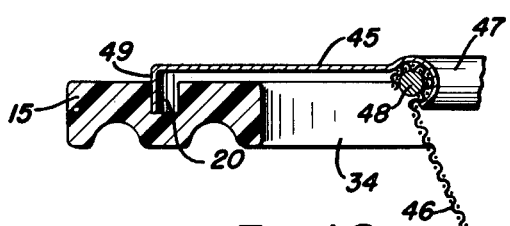

Patented June 17, 1952

2,601,087

UNITED STATES PATENT OFFICE 2,601,087

KITCHEN TOOL AND UTENSIL

William L. Buedingen, Rochester, N. Y.

Application August 5, 1949, Serial No. 108,827

4 Claims. (Cl. 146—180)

The present invention relates to kitchen utensils or tools. In one aspect, the invention relates to food graters intended for use in kitchens or other places where food is prepared. In a further aspect, the invention relates to a combination tool and holder where the holder may be used for removably supporting various forms of kitchen utensils or tools, such as food graters, food strainers, etc.

Food graters, which are in conventional use, are adapted to be held by one hand at one end with the other end resting against a board or the top of a kitchen cabinet, or counter, and inclined thereto, while the article of food, which is to be grated, is rubbed back and forth across the grater. Due to the inclined position of the grater, it may slip, and not infrequently the person using the grater is scratched or cut by the cutting edges of the grater. Due to the inclined position of the grater, also, the food, which is grated, is scattered over the board or counter, and more or less of a mess is made, to say nothing of the waste of food.

One object of the invention is to provide a food grater which may be supported across the top of an open bowl or pan in horizontal position so that all of the grated food will drop into the bowl or pan, thus preventing waste.

Another object of the invention is to provide a food grater which may be supported across the top of an open bowl or pan in horizontal position so that it will not slip and so that the chances of injury to the fingers are more or less completely obviated.

Another object of the invention is to provide a combination type kitchen instrument comprising a holder into which any one of several different types of graters, shredders, cutters, strainers, etc. can readily be slipped and from which such devices can readily be removed so that in but an instant one type of tool or utensil can readily be substituted for another.

Another object of the invention is to provide a combination type kitchen instrument of the character described, which may be mounted across the top of an open bowl or pan for removably supporting any one of several different types of graters, or shredders, or strainers or like articles of kitchen use.

Still another object of the invention is to provide a combination type kitchen instrument of the character described, which will permit ready positioning and removal of the different tools or utensils and which will hold each of them securely against movement when in use.

Other objects of the invention will be apparent hereinafter from the specification and from the recital of the appended claims.

In the drawings:

Fig. 7 is a plan view of a modified form of grater;

Fig. 8 is a side elevation of this grater;

Figs. 9 and 10 are an enlarged fragmentary plan view and an enlarged sectional view, respectively, showing one of the cutting teeth of this modified form of grater;

Fig. 11 is a side elevation showing a strainer mounted in the holder; and

Fig. 12 is a fragmentary sectional view on a line 12—12 of Fig. 11 on an enlarged scale.

Figure 1:
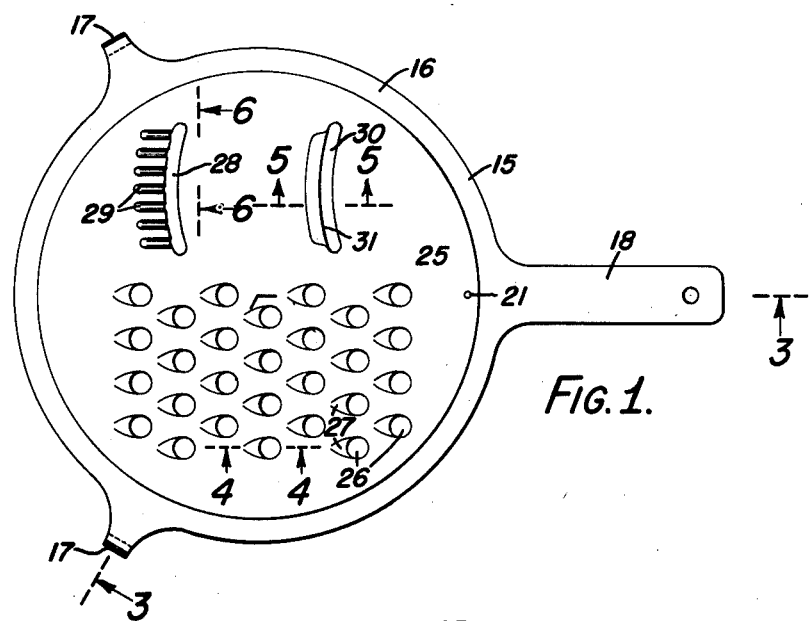
Fig. 1 is a plan view showing a combination grater and shredder made according to one embodiment of this invention.
Figure 2:
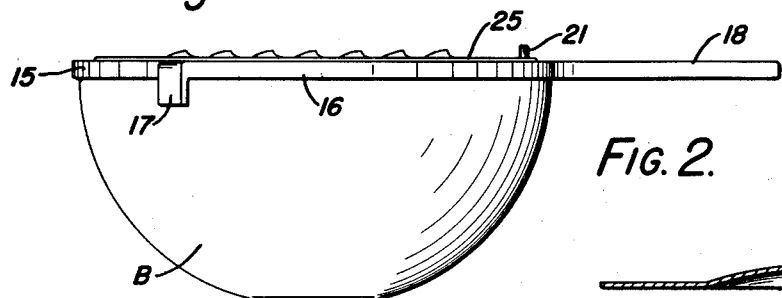
Fig. 2 is a side elevational view showing the device mounted upon a bowl.
Figure 4:
Fig. 4 is a fragmentary sectional view on a much enlarged scale taken on the line 4—4 of Fig. 1.

As already indicated, the device of the present invention comprises a holder and a removable tool or utensil that may be removably mounted in the holder. Different types of tools or utensils can be made to fit the same holder so that they can be used selectively with that holder. The holder 15 has a ring portion 16 which is formed with two down-turned angularly spaced lugs 17 and with a handle 18 spaced angularly between the two lugs. The holder may be made of any suitable material but is preferably made of a colored plastic to enhance its appearance and the attractiveness of the whole device.

The ring portion 16 of the holder 15 is provided with a circular groove 20 in its upper face and with a pin 21 projecting upwardly from the upper face that lies within the compass of groove 20. Any of the tools or utensils which are to be carried by the holder are mounted in the groove 20 and held against movement relative to the holder by the pin 21.

In Figs. 1 to 6 inclusive I have shown one form of combined slicer and shredder plate that may be mounted in the holder. This comprises a plate 25 made of stiff sheet metal and having a plurality of holes 26 punched therein and a plurality of cutting teeth 27 formed by striking up the metal back of these holes. These extend over approximately half of the area of the plate 25. On the other half there is a circular slot 28 punched out and the metal back of this slot is struck up and fluted, shown in Fig. 6 and as denoted at 29, to provide cutting edges which may be used to form latticed potatoes. Another slot 30 is punched out of the disc 25 and the metal struck up from behind this slot to provide a cutting edge at 31 (Fig. 5) for cutting or slicing potatoes or other vegetables.

The plate 25 is formed with a peripheral flange 32 and with a hole 33 within the compass of the flange. The plate 25 is adapted to be mounted in the groove 20 of the holder 15 with the aperture 33 receiving the pin 21. The diameter of the plate 25 is preferably made equal to the outside diameter of the groove 20 so that the flange 32 of the plate 25 will seat snugly against the outside of the groove and the pin 21 may serve simply to prevent rotary movement of the plate in the holder.

Figure 3:
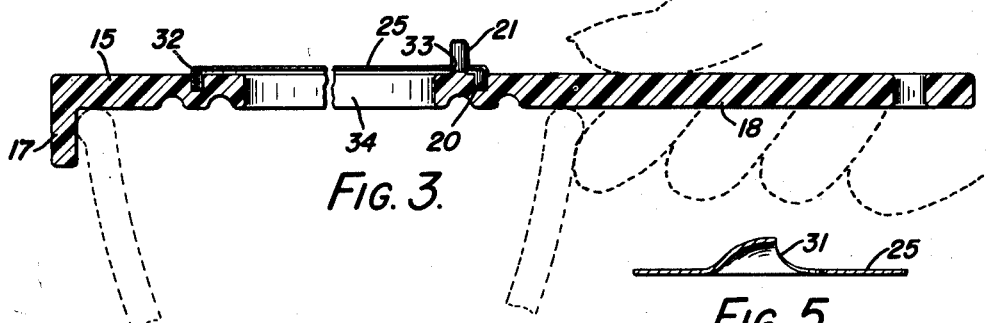
Fig. 3 is a fragmentary section on a greatly enlarged scale taken on the line 3—3 of Fig. 1 looking in the direction of the arrows and showing diagrammatically how the device is held in use.
Figure 5:
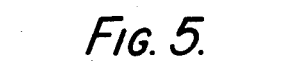
Fig. 5 is a fragmentary sectional view, also on an enlarged scale, taken on the line 5—5 of Fig. 1.
Figure 6:
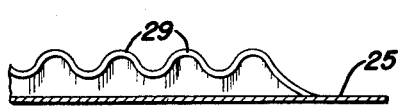
Fig. 6 is a fragmentary sectional view taken on the line 6—6 of Fig. 1 looking in the direction of the arrows.

In use, the assembled slicer or shredder is placed upon a bowl or pan B with the two lugs or prongs 17 engaging the outside of the bowl at two spaced points and with the housewife holding the handle 18 in one hand, with that hand seating against the outside of the bowl at a third point, as shown in Fig. 3, so that movement of the grater relative to the bowl is prevented. The housewife then moves the food, which is to be grated or cut up, across the cutting edges of the tool in a horizontal plane. This makes an easy motion, prevents cutting or scratching the fingers, and insures that all the food is utilized because it falls through the holes 26 or slots 28 or 30 of the grater and central opening 34 in the ring portion 16 of the holder into the bowl.

As previously stated, one of the features of my invention is that a number of different tools or utensils can be used with the same holder; and all that it is necessary to do to change tools or utensils is to push the one previously in use out of the holder and push another into place.

Another form of grater is shown at 35 in Figs. 7 and 8. This grater has a peripheral flange 36 adapted to be seated in the groove 20 of the holder 15 and a hole 37 adapted to receive pin 21. The plate 35 has generally X-shaped slots 33 punched therein and spherical portions 39 struck up therefrom which contain the slots 38 (Figs. 9 and 10). The sides of the slots 38, therefore, form cutting edges for grating.

The plate 35 is shown in Fig. 7 with cutting edges 38 over only part of its surface area. Obviously they can be made to extend over its whole area, or it may be provided with cutting edges 38 over part of its area and with other forms of cutting edges, such as 29 or 31, for instance, on other parts of its surface.

The holder 15 may be used also, as previously indicated, for supporting other types of tools than graters or shredders. It may be used, for instance, for supporting strainers. One such form of strainer is shown in Figs. 11 and 12. This comprises a plate or ring 45 which is formed with a central beading 47. The strainer 46, which is of conical shape, is secured to the plate 45 by a snap ring 48 or other suitable securing means. The plate 45 is formed with a peripheral flange 49 adapted to be seated in the groove 20 of the holder, and with a hole adapted to receive pin 21 of the holder. By mounting the holder, with the strainer positioned therein, so that it extends across the top of an open bowl, pan, or other receptacle, food can be strained directly into the receptacle.

Insofar as the grater or shredder is concerned, my invention has several advantages. The work is always visible; there is less danger of cutting the fingers than with conventional graters; a circular motion may be used in grating which is more restful; and grating can be done faster.

The several forms of tools shown in the drawings are only some types of tools that may be used in my holder; and the drawings are illustrative only of the range of use of the invention.

While the invention has been described in connection with certain specific embodiments thereof, then, it is to be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A kitchen tool comprising in combination, a generally ring-shaped holder having a circular groove formed in one face and having spaced downturned prongs about its periphery projecting from its other face and having a laterally extending handle so that it may be held across the top of an open receptacle, a circular plate adapted to be positioned removably in the holder and having a downturned peripheral flange which seats in said groove against one side wall thereof when the plate is positioned in the holder, a pin, and a hole for receiving said pin, the pin being formed integral with one of the two first-named parts within the compass of said groove and flange and the hole being formed in the other part also within the compass of said groove and flange, said plate having a central opening therethrough, a strainer, and means for securing said strainer in the opening.

2. In combination, a rigid holder, and a removable kitchen tool, such as a food grater, food strainer, food shredder, and the like, said holder having a central circular-shaped opening therethrough, a circular groove in its upper face concentric with said opening but spaced therefrom, a plurality of down-turned prongs angularly-spaced about its periphery which project below the lower face of the holder to engage the periphery of an open receptacle, and a laterally-extending handle for holding the holder across the top of the receptacle, and said kitchen tool having an operative portion which registers with the opening in the holder when the tool is positioned in the holder, a rigid, circular downturned peripheral flange which is of a diameter to seat against the radially outside wall of the groove in the holder when the tool is positioned on the holder, and a hole radially inside said flange, and said holder having a pin between its central opening and its groove, which fits into said hole to hold the tool against rotation relative to the holder when the tool is positioned thereon.

3. In combination, a rigid holder, and a removable kitchen tool such as a food grater, food strainer, food shredder, and the like, said holder having a central opening therethrough, a circular groove in its upper face surrounding said opening but spaced therefrom, a plurality of members angularly-spaced about its periphery which project below its lower face to engage the periphery of an open receptacle, and a laterally-extending handle for holding the holder on the receptacle, and said kitchen tool having an operative portion which registers with the opening in the holder when the tool is positioned in the holder, and having a rigid, circular down-turned peripheral flange which is of a diameter to seat against the radially-outside wall of the groove in the holder when the tool is positioned on the holder, a pin, and a hole for receiving said pin, said pin being formed integral with one of the two cooperating parts of the combination, and said hole being formed in the other of said two cooperating parts within the compass of said groove and flange.

4. In combination, a rigid holder, and a removable kitchen tool, such as a food grater, food strainer, food shredder, and the like, said holder having a central opening therethrough, a circular groove in its upper face surrounding said opening but spaced therefrom, and a plurality of members angularly-spaced about its periphery which project below its lower face to engage the periphery of an open receptacle, and said kitchen tool having an operative portion which registers with the opening in the holder when the tool is positioned in the holder, and having a rigid circular down-turned peripheral flange which is of a diameter to seat against one side wall of said groove when the tool is positioned in the holder, and separate interengaging means formed on the holder and tool for preventing rotary movement of the tool in the holder.

WILLIAM L. BUEDINGEN.

REFERENCES CITED

The following references are of record in the file of this patent:

UNITED STATES PATENTS

| Number | Name | Date |
| --- | --- | --- |
| D. 99,361 | Moran | Apr. 21, 1936 |
| 690,524 | Knight | Jan. 7, 1902 |
| 1,008,438 | Silberberg | Nov. 14, 1911 |
| 2,030,274 | Stewart | Feb. 11, 1936 |
| 2,078,507 | Pace | Apr. 27, 1937 |
| 2,466,347 | Ziemianin, Sr. | Apr. 5, 1949 |

FOREIGN PATENTS

| Number | Country | Date |
| --- | --- | --- |
| 9,511 | Great Britain | June 27, 1884 |
| 67,153 | Norway | Dec. 6, 1943 |